US011315573B2

(12) United States Patent
Doi

(10) Patent No.: US 11,315,573 B2
(45) Date of Patent: Apr. 26, 2022

(54) SPEAKER RECOGNIZING METHOD, SPEAKER RECOGNIZING APPARATUS, RECORDING MEDIUM RECORDING SPEAKER RECOGNIZING PROGRAM, DATABASE MAKING METHOD, DATABASE MAKING APPARATUS, AND RECORDING MEDIUM RECORDING DATABASE MAKING PROGRAM

(71) Applicant: PANASONIC INTELLECTUAL PROPERTY CORPORATION OF AMERICA, Torrance, CA (US)

(72) Inventor: Misaki Doi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 107 days.

(21) Appl. No.: 16/843,595

(22) Filed: Apr. 8, 2020

(65) Prior Publication Data

US 2020/0327894 A1 Oct. 15, 2020

(30) Foreign Application Priority Data

Apr. 12, 2019 (JP) .............................. JP2019-076058

(51) Int. Cl.
*G10L 17/06* (2013.01)
*G06F 16/683* (2019.01)
(Continued)

(52) U.S. Cl.
CPC .............. *G10L 17/06* (2013.01); *G06F 16/65* (2019.01); *G06F 16/683* (2019.01); *G06F 21/30* (2013.01); *G06F 21/31* (2013.01); *G06F 21/32* (2013.01)

(58) Field of Classification Search
CPC combination set(s) only.
See application file for complete search history.

(56) References Cited

U.S. PATENT DOCUMENTS

| 8,903,725 B2 * | 12/2014 | Pilz | ......................... G06F 21/32 704/273 |
| 2015/0067822 A1 * | 3/2015 | Randall | ................... G06F 21/32 726/17 |

(Continued)

FOREIGN PATENT DOCUMENTS

JP 2017-223848 12/2017

*Primary Examiner* — Linda Wong
(74) *Attorney, Agent, or Firm* — Greenblum & Bernstein, P.L.C.

(57) ABSTRACT

A speaker recognizing method includes acquiring subject identification information that is identification information of an authentic person who the subject speaker claims to be, calculating a first feature value representing a feature value of the subject voice signal, selecting a group including pieces of the voice information associated with the subject identification information, from the first database, calculating degrees of similarity between the pieces of the voice information included in the selected group and the first feature value and a subject degree of similarity representing a degree of similarity between the voice information associated with the subject identification information, the voice information being stored in the second database, and the first feature value, calculating a rank of the subject degree of similarity in the calculated degrees of similarity, and when the rank is smaller than a given first rank, determining the subject speaker to be the authentic person.

10 Claims, 10 Drawing Sheets

(51) Int. Cl.
  *G06F 16/65*  (2019.01)
  *G06F 21/31*  (2013.01)
  *G06F 21/32*  (2013.01)
  *G06F 21/30*  (2013.01)

(56) References Cited

U.S. PATENT DOCUMENTS

| | | | |
|---|---|---|---|
| 2015/0340039 A1* | 11/2015 | Gomar | G10L 17/02 |
| | | | 704/246 |
| 2017/0140760 A1* | 5/2017 | Sachdev | G10L 17/06 |
| 2017/0169828 A1* | 6/2017 | Sachdev | G10L 25/51 |
| 2017/0278518 A1* | 9/2017 | Kashtan | G10L 17/04 |
| 2018/0040325 A1* | 2/2018 | Melanson | G10L 17/00 |
| 2018/0158463 A1* | 6/2018 | Ge | G10L 17/04 |
| 2019/0005962 A1* | 1/2019 | Mart Nez Gonz Lez | |
| | | | G10L 17/02 |
| 2019/0043508 A1* | 2/2019 | Sak | G10L 17/18 |
| 2019/0228779 A1* | 7/2019 | Lesso | G10L 17/18 |
| 2019/0278895 A1* | 9/2019 | Streit | G06F 21/602 |
| 2019/0311261 A1* | 10/2019 | Baldwin | G06N 3/049 |
| 2019/0370445 A1* | 12/2019 | Fong | G06K 9/6293 |
| 2021/0043189 A1* | 2/2021 | Pyun | G10L 15/22 |
| 2021/0256104 A1* | 8/2021 | Tsuruga | G06F 3/16 |

* cited by examiner

FIG.4

FIRST DATABASE: 21

| REGISTERED SPEAKER ID | VOICE INFORMATION ID | VOICE INFORMATION |
|---|---|---|
| A | X001 | (Y1, Y2, ...) |
| A | X002 | (Y1, Y2, ...) |
| A | X003 | (Y1, Y2, ...) |
| ... | ... | ... |
| B | X004 | (Y1, Y2, ...) |
| B | X005 | (Y1, Y2, ...) |
| ... | ... | ... |

FIG.5

SECOND DATABASE: 22

| REGISTERED SPEAKER ID | VOICE INFORMATION |
|---|---|
| A | (Y1, Y2, ...) |
| A | (Y1, Y2, ...) |
| C | (Y1, Y2, ...) |
| ... | ... |

FIG.7
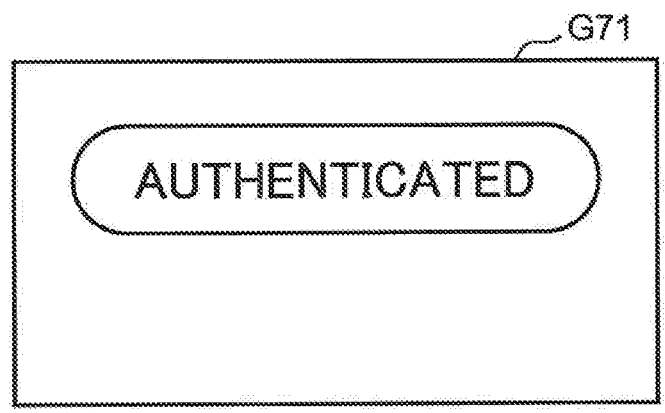
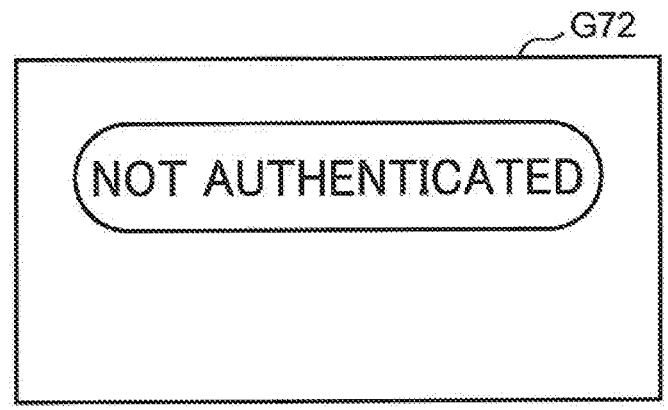

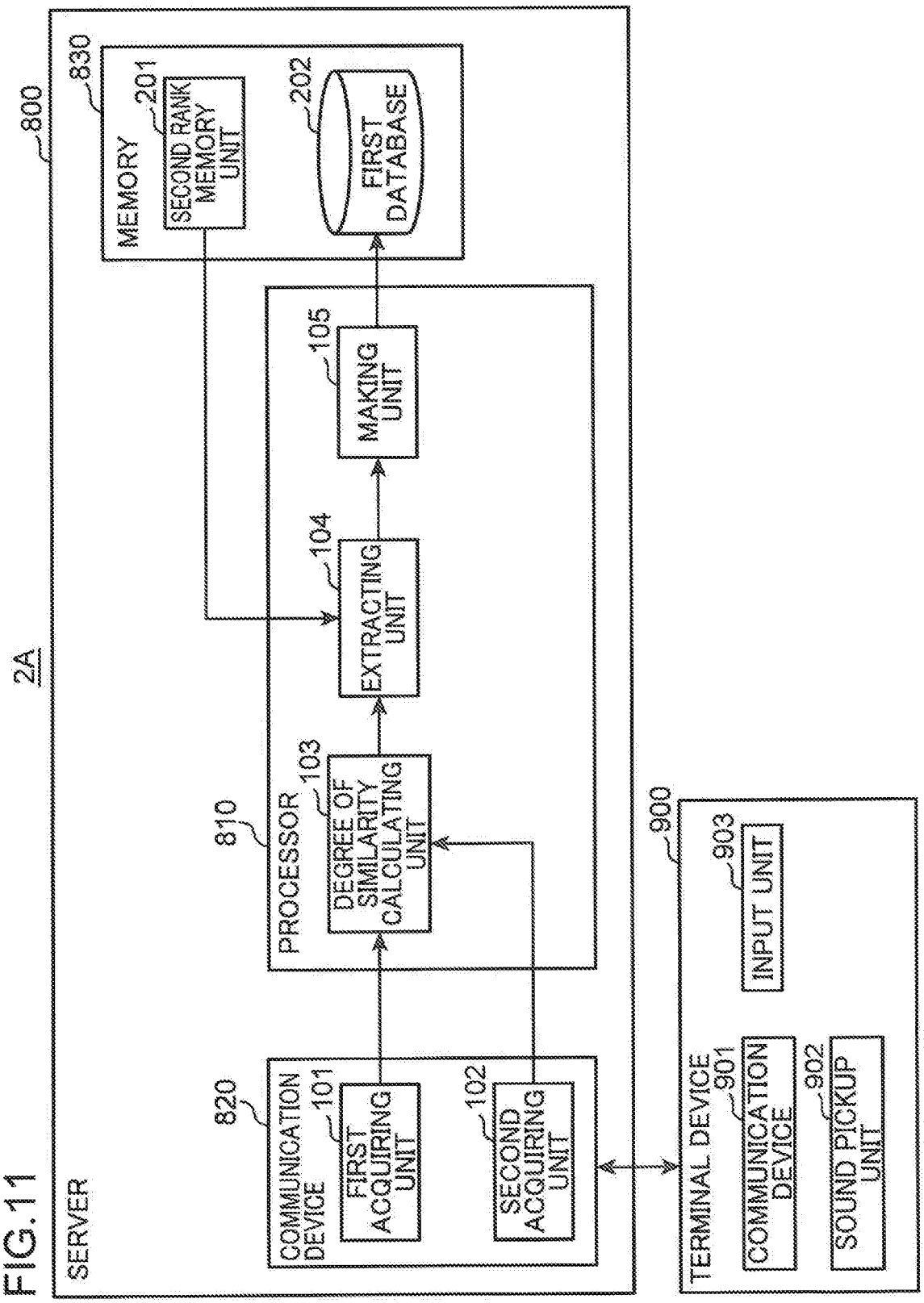

SPEAKER RECOGNIZING METHOD, SPEAKER RECOGNIZING APPARATUS, RECORDING MEDIUM RECORDING SPEAKER RECOGNIZING PROGRAM, DATABASE MAKING METHOD, DATABASE MAKING APPARATUS, AND RECORDING MEDIUM RECORDING DATABASE MAKING PROGRAM

FIELD OF THE INVENTION

The present disclosure relates to a technique for recognizing whether a speaker is an authentic person, using a voice signal.

BACKGROUND ART

A technique by which a voice signal of an unknown subject speaker is acquired and whether the subject speaker is an authentic person is recognized based on the acquired voice signal has been known in recent years. For example, Japanese Unexamined Patent Application Publication No. 2017-223848 discloses a technique according to which a voice signal of a subject speaker is acquired to calculate a feature value called i-vector, degrees of similarity between the calculated feature value and respective pieces of voice information of unspecified speakers and a registered speaker, the voice information being stored in a large-scale database, are calculated, a rank of a degree of similarity of voice information of the registered speaker, who is an authentic person the subject speaker claims to be, in the above calculated degrees of similarity is calculated, and when the calculated rank is smaller than a given rank, the subject speaker is determined to be the authentic person.

According to the technique disclosed in Japanese Unexamined Patent Application Publication No. 2017-223848, however, to improve accuracy in identifying the subject speaker as the authentic person, the number of pieces of voice information of unspecified speakers stored in the large-scale voice database needs to be increased. This raises a problem of an increase in a calculation volume, creating a need of a further improvement action.

SUMMARY OF THE INVENTION

An object of the present disclosure is to provide a speaker recognizing method and the like that improve accuracy in identifying a subject speaker as an authentic person who the speaker claims to be, without increasing a calculation volume.

One aspect according to the present disclosure provides a speaker recognizing method according to which a computer recognizes a speaker, using a first database storing voice information indicating voices of a plurality of unspecified speakers and a second database storing identification information of a plurality of registered speakers and the voice information such that the identification information and the voice information are associated with each other, in which in the first database, for each of the registered speakers, pieces of the voice information of unspecified speakers similar in voice feature to each other are grouped such that the pieces of the voice information are associated in advance with the identification information of a registered speaker corresponding to the group, and in which the speaker recognizing method includes: acquiring a subject voice signal indicating a voice uttered by a subject speaker; acquiring subject identification information that is the identification information of an authentic person who the subject speaker claims to be; calculating a first feature value representing a feature value of the subject voice signal; selecting a group including pieces of the voice information associated with the subject identification information, from the first database; calculating degrees of similarity between the pieces of the voice information included in the selected group and the first feature value and a subject degree of similarity representing a degree of similarity between the voice information associated with the subject identification information, the voice information being stored in the second database, and the first feature value; calculating a rank of the subject degree of similarity in the calculated degrees of similarity; and when the rank is equal to or smaller than a given first rank, determining the subject speaker to be the authentic person.

BRIEF DESCRIPTION OF THE DRAWINGS

FIG. 4 shows an example of a data configuration of a first database;

FIG. 5 shows an example of a data configuration of a second database;

FIG. 7 shows an example of messages output by an output device;

FIG. 11 is a block diagram of an example of a configuration of a database making apparatus according to a modification of the present disclosure.

DESCRIPTION OF EMBODIMENTS

Figure 1:
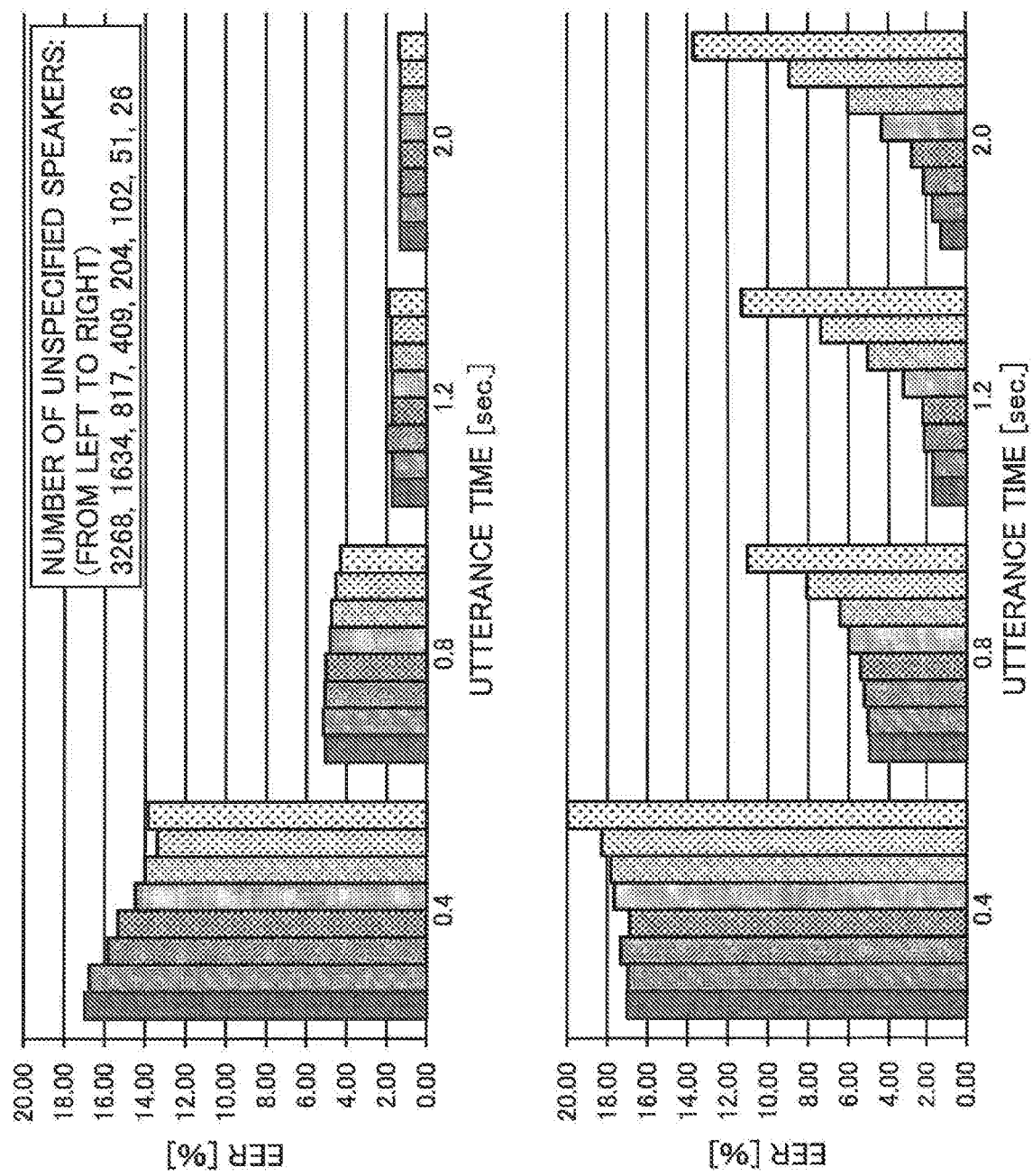
FIG. 1 shows graphs indicating results of tests that have been carried out on females to substantiate knowledge provided by the present disclosure.

Circumstances Having Led to Devising of One Aspect of the Present Disclosure Recently, people pay attention to a technique that, to prevent impersonation, uses a voice uttered by a subject person. For example, a new internet banking service is already around, which prompts a subject person to enter identification information and utter a voice, and identifies the subject person as the subject person himself or herself when the identification information and the uttered voice meet a given condition. A new operation of a room access control system is also under review, according to which, for example, the system causes a card reader to read identification information recorded on a card and prompts a subject person to utter a voice, and then allows the subject person to enter or exit a room when the identification information and a feature value of a voice signal indicative of the uttered voice meet a given condition.

A technique applicable to such a service and operation is disclosed in Japanese Unexamined Patent Application Publication No. 2017-223848. Japanese Unexamined Patent Application Publication No. 2017-223848 discloses a technique according to which degrees of similarity between a feature value of a voice signal uttered by a subject speaker and respective pieces of voice information of unspecified speakers and a registered speaker, the voice information being stored in a large-scale database, are calculated, a rank of a degree of similarity of voice information of the registered speaker, who is an authentic person the subject speaker claims to be, in the above calculated degrees of similarity is calculated, and when the calculated rank is smaller than a given rank, the subject speaker is determined to be the authentic person.

According to the technique disclosed in Japanese Unexamined Patent Application Publication No. 2017-223848, however, to improve accuracy in identifying the subject speaker as the authentic person, the number of pieces of voice information of unspecified speakers stored in the large-scale voice database needs to be increased. This raises a problem of an increase in a calculation volume and, consequently, determining whether the subject speaker is the authentic person takes much time. The technique of Japanese Unexamined Patent Application Publication No. 2017-223848 raises another problem that a shorter period of the subject speaker's utterance results in a drop in the accuracy in identifying the subject speaker as the authentic person.

In view of these circumstances, the inventor has studied a method by which the accuracy in identifying the subject speaker as the authentic person is improved without increasing the calculation volume. Thus, the inventor has obtained knowledge that, in application of the technique of Japanese Unexamined Patent Application Publication No. 2017-223848, the accuracy in identifying the subject speaker as the authentic person is improved by taking a method by which, to calculate the above degrees of similarity, pieces of voice information of all the unspecified speakers, the pieces of voice information being stored in the large-scale database, are not used but pieces of voice information of unspecified speakers similar in features to identification information of the authentic person who the subject speaker claims to be are picked to use the picked pieces of voice information only. The inventor has obtained additional knowledge that taking this method improves the accuracy in identifying the subject speaker as the authentic person even when a period of the subject speaker's utterance is short.

FIG. 1 shows graphs indicating results of tests that have been carried out on females to substantiate the knowledge provided by the present disclosure. The graph on the upper side indicates a result of a test in which the method of the present disclosure (present method) is adopted, while the graph on the lower side indicates a result of a test in which the method of Japanese Unexamined Patent Application Publication No. 2017-223848 (comparative example) is adopted. In both graphs, the vertical axis represents an error rate and the horizontal axis represents an utterance time.

In these tests, error rates are calculated in a case where the number of unspecified speakers is determined to be 3268, 1634, 817, 409, 204, 102, 51, and 26 in each of a plurality of utterance times of 0.4 seconds, 0.8 seconds, 1.2 seconds, and 2.0 seconds.

The error rate, as described in Japanese Unexamined Patent Application Publication No. 2017-223848, is defined as an intersection between a growing curve indicating a relationship between a probability of determining a voice of an authentic person to be a voice of a different person (authentic person rejection rate), the probability being plotted on the vertical axis, and a given rank plotted on the horizontal axis, and a declining curve indicating a relationship between a probability of determining a voice of an impersonator to be a voice of the authentic person (different person acceptance rate), the probability being plotted on the vertical axis, and a given rank plotted on the horizontal axis. This intersection is plotted on the vertical axis.

According to the present method, as voice information of unspecified speakers, pieces of voice information of 3268 speakers, 1634 speakers, 817 speakers, 409 speakers, 204 speakers, 102 speakers, 51 speakers, and 26 speakers are used as pieces of voice information ranked in the order of higher similarity to a feature value of voice information of the subject speaker. In contrast, in the comparative example, randomly extracted pieces of voice information of 3268 speakers, 1634 speakers, 817 speakers, 409 speakers, 204 speakers, 102 speakers, 51 speakers, and 26 speakers are used as voice information of unspecified speakers.

In each of the graphs on the upper and lower sides in FIG. 1, 8 bars in each utterance time represent error rates that result respectively when the number of unspecified speakers are determined to be 3268, 1634, 817, 409, 204, 102, 51, and 26, in order from the left.

As indicated by the graphs on the upper and lower sides, the error rate decreases with an increase in the utterance time in the example of the present method as well as in the comparative example. An overall result indicates, however, that a decrease in the error rate is greater in the example of the present method than in the comparative example. It is particularly notable in the comparative example that in each utterance time, the error rate increases as the number of unspecified speakers decreases. In the example of the present method, however, such a tendency does not develop. Specifically, the example of the present method demonstrates that in long utterance times of "1.2 seconds" and "2.0 seconds", the error rate is kept low at 2.00% or lower, regardless of the number of unspecified speakers. The example of the present method also demonstrates that in short utterance times of "0.4 seconds" and "0.8 seconds", the error rate decreases as the number of unspecified speakers decreases. The above facts lead to a conclusion that according to the present method, decreasing the number of unspecified speakers from "3268" to "26" does not increase the error rate but rather decreases the error rate. It is thus concluded that according to the present method, decreasing the number of unspecified speakers allows an improvement in the accuracy in identifying the subject speaker as the authentic person, thus leading to a reduction in the calculation volume. It is also concluded that according to the present method, even in the case of a short utterance time, decreasing the number of unspecified speakers allows an improvement in the accuracy in identifying the subject speaker as the authentic person.

It is assumed that these test results have been obtained because a specific rule of thumb is reflected in the tests, the rule of thumb expressing a principle that in a case of competition between individuals similar in ability to each other, each individual has difficulty in raising his or her rank and therefore ranking in the case of competition between individuals similar in ability to each other is more reliable than ranking in a different case of competition.

Figure 2:
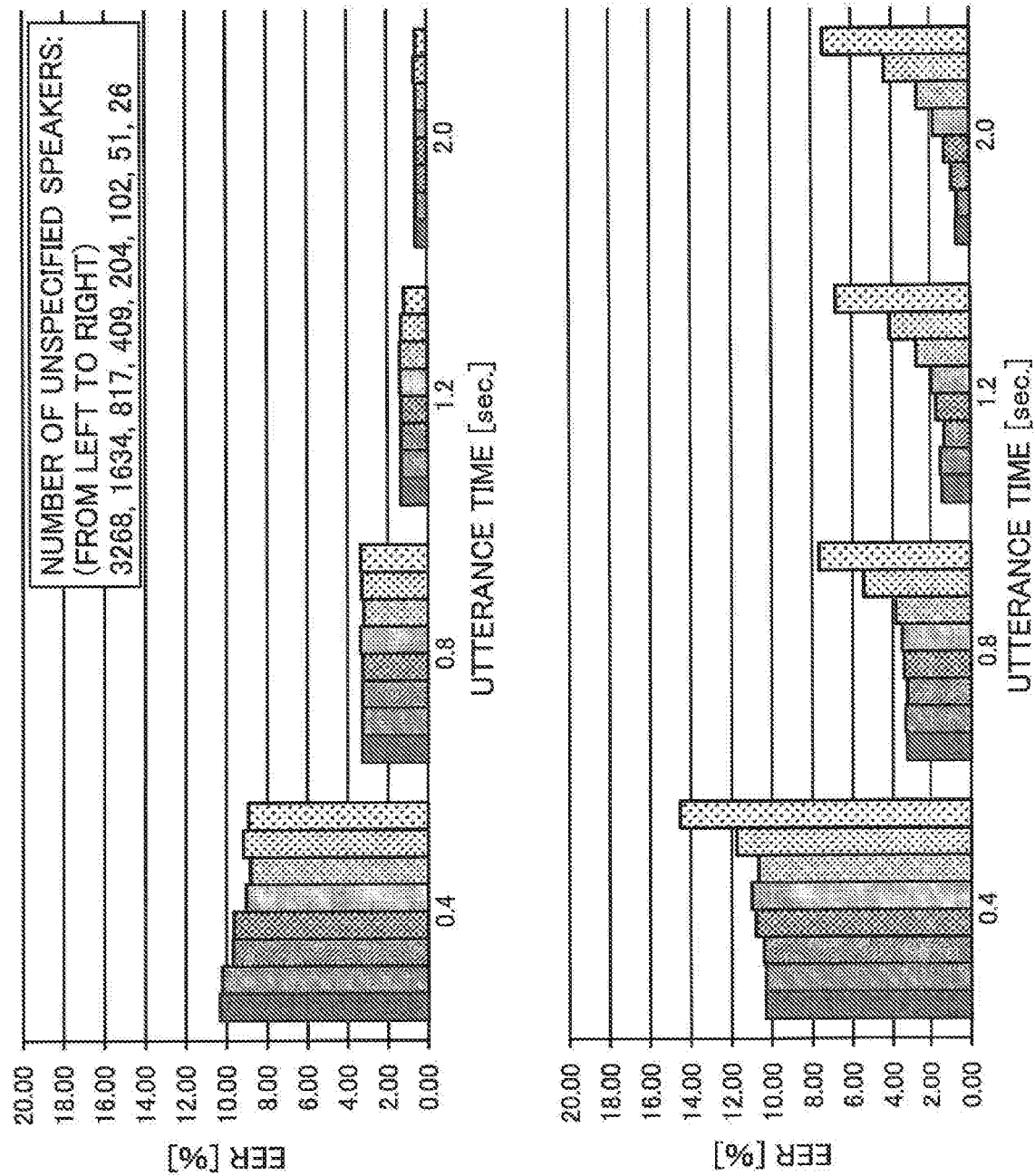
FIG. 2 shows graphs indicating results of tests that have been carried out on males to substantiate knowledge provided by the present disclosure.

FIG. 2 shows graphs indicating results of tests that have been carried out on males to substantiate the knowledge provided by the present disclosure. The graph on the upper side indicates a result of a test in which the method of the present disclosure (present method) is adopted, while the graph on the lower side indicates a result of a test in which the method of Japanese Unexamined Patent Application Publication No. 2017-223848 (comparative example) is adopted. The test results shown in FIG. 2 are the same in test details as the test results shown in FIG. 1. The test results shown in FIG. 2 are observed to be similar to the test results shown in FIG. 1. This demonstrates that the present method is effective, regardless of sex.

Based on the above knowledge, the inventor has conceived respective aspects of the present disclosure as described below.

One aspect according to the present disclosure provides a speaker recognizing method according to which a computer recognizes a speaker, using a first database storing voice information indicating voices of a plurality of unspecified speakers and a second database storing identification information of a plurality of registered speakers and the voice information such that the identification information and the voice information are associated with each other, in which in the first database, for each of the registered speakers, pieces of the voice information of unspecified speakers similar in voice feature to each other are grouped such that the pieces of the voice information are associated in advance with the identification information of a registered speaker corresponding to the group, and in which the speaker recognizing method includes: acquiring a subject voice signal indicating a voice uttered by a subject speaker, acquiring subject identification information that is the identification information of an authentic person who the subject speaker claims to be; calculating a first feature value representing a feature value of the subject voice signal; selecting a group including pieces of the voice information associated with the subject identification information, from the first database; calculating degrees of similarity between the pieces of the voice information included in the selected group and the first feature value and a subject degree of similarity representing a degree of similarity between the voice information associated with the subject identification information, the voice information being stored in the second database, and the first feature value; calculating a rank of the subject degree of similarity in the calculated degrees of similarity; and when the rank is equal to or smaller than a given first rank, determining the subject speaker to be the authentic person.

According to this aspect, in the first database storing piece of voice information of the unspecified speakers, for each of the registered speakers, pieces of the voice information of unspecified speakers similar in voice feature to each other are grouped such that the pieces of the voice information are associated in advance with the identification information of a registered speaker corresponding to the group.

The group including pieces of the voice information associated with the subject identification information of the authentic person who the subject speaker claims to be, is selected from the first database, and the degrees of similarity between the first feature value representing the feature value of the subject voice signal and the pieces of the voice information included in the selected group are calculated. Then, the rank of the subject degree of similarity, which represents the degree of similarity between the voice information associated with the subject identification information, the voice information being stored in the second database, and the first feature value, in the calculated degrees of similarity is calculated, and when the rank is equal to or smaller than the given first rank, the subject speaker is determined to be the authentic person.

In this manner, according to this configuration, when the degrees of similarity are calculated, pieces of voice information of all the unspecified speakers, the pieces of voice information being stored in the first database, am not used but pieces of voice information included in the selected group, that is, pieces of voice information of unspecified speakers similar to voice information of the authentic person who the subject speaker claims to be, are used. As a result, according to this configuration, the accuracy in identifying the subject speaker as the authentic person can be improved without increasing the calculation volume. In this aspect, the accuracy in identifying the subject speaker as the authentic person can be improved also in a case where the utterance time is short.

It may be possible in the above configuration that the variance or standard deviation of the calculated degrees of similarity is calculated and the first rank is raised in ranking as the variance or standard deviation decreases.

According to such a configuration, the first rank is raised in ranking as the variance or standard deviation of the calculated degrees of similarity decreases. Thus, when the selected group is made up of pieces of voice information highly similar to the first feature value, the first rank is raised in ranking, which makes determining the subject speaker to be the authentic person more difficult. This means an improvement in the accuracy in identifying the subject speaker as the authentic person.

In the above configuration, the subject identification information may be the identification information entered by the subject speaker.

According to this configuration, because the subject speaker enters the subject identification information, the subject identification information can be acquired easily.

In the above configuration, the subject voice signal may include utterance contents that the subject speaker claims himself or herself to be the authentic person, and the subject identification information may be the utterance contents obtained by processing the subject voice signal through voice recognition.

According to this configuration, for example, by causing the subject speaker to utter the name of the authentic person who the subject speaker claims to be, both subject identification information and subject voice signal are acquired. This makes it unnecessary for the subject speaker to separately enter subject identification information, thus sparing the subject speaker trouble.

In the above configuration, a result of determination on whether the subject speaker is the authentic person may be displayed.

According to this configuration, displaying the result of determination on whether the subject speaker is the authentic person allows the subject speaker to confirm whether the subject speaker's claim has been accepted.

In the above configuration, the voice information stored in the first database may include a voice signal of the unspecified speaker while the voice information stored in the second database may include the voice signal of the registered speaker, and a feature value of the voice signal of the unspecified speaker and a feature value of the voice signal associated with the subject identification information, the voice signal being stored in the second database, may be each calculated as a second feature value, and in calculation of the degree of similarity, the degree of similarity between the first feature value and the second feature value may be calculated.

According to this configuration, in the first database and the second database, the voice signal is stored as the voice information and the second feature value is calculated from the stored voice signal. It is unnecessary, therefore, to store a feature value in advance in the first database and the second database. As a result, the first database and the second database can be made easily.

In the above configuration, the voice information stored in the first database may include a feature value of a voice signal of the unspecified speaker, and the voice information stored in the second database may be the feature value of the voice signal of the registered speaker.

According to this configuration, in the first database and the second database, the feature value of the voice signal is stored as the voice information. The degree of similarity, therefore, can be calculated without carrying out a process of calculating the feature value from the voice signal stored in the first database and the second database.

In the above configuration, the first database may be a database in which, for each of the registered speakers, pieces of the voice information with the rank in the degree of similarity to the voice information of the unspecified speakers being equal to or smaller than a given second rank are extracted and grouped, and the second rank may be a minimum number of the unspecified speakers that is preset for minimizing an error rate.

According to this configuration, respective numbers of pieces of voice information included respectively in a plurality of groups making up of the first database can be determined to be the same. In the first database, therefore, pieces of voice information can be grouped systematically. In addition, because the second rank is specified as the minimum number of the unspecified speakers that is preset for minimizing the error rate, the calculation volume for determining the degree of similarity can be reduced and the accuracy in identifying the subject speaker as the authentic person can be improved.

Another aspect according to the present disclosure provides a database making method of making a database used by a computer to perform speaker recognition, the database making method including: acquiring voice information indicating voices of a plurality of unspecified speakers; acquiring identification information and the voice information of each of a plurality of registered speakers; calculating a degree of similarity in feature value between the voice information of the registered speakers and the voice information of the unspecified speakers; for each of the registered speakers, extracting the voice information of an unspecified speaker, the voice information having the degree of similarity meeting a given first condition; and, for each of the registered speakers, associating the identification information of the registered speaker with the voice information extracted for each of the registered speakers, and grouping pieces of the voice information of the unspecified speakers to make a database.

According to this configuration, for each of the registered speakers, the voice information of an unspecified speaker, the voice information having the degree of similarity meeting the given first condition, is extracted, and, for each of the registered speakers, the identification information of the registered speaker is associated with the extracted voice information of the unspecified speaker. Pieces of the voice information of the unspecified speakers are thus grouped to make the database. Thus, a database for achieving a speaker recognizing method that improves the accuracy in identifying the subject speaker as the authentic person without increasing calculation volume, can be made.

In the above configuration, the first condition may be a requirement that the degree of similarity be equal to or smaller than a given rank, and the given rank may be a minimum number of the unspecified speakers that is preset for minimizing an error rate.

According to this configuration, respective numbers of pieces of voice information included respectively in a plurality of groups making up of the first database can be determined to be the same. In the first database, therefore, pieces of voice information can be grouped systematically. In addition, because the given rank is specified as the minimum number of the unspecified speakers that is preset for minimizing the error rate, the calculation volume for determining the degree of similarity can be reduced and the accuracy in identifying the subject speaker as the authentic person can be improved.

In the above configuration, the first condition may be a requirement that the degree of similarity be equal to or larger than a given value.

According to this configuration, each group making up of the first database can be made up of pieces of voice information with a degree of similarity to voice information of a registered speaker corresponding to the group being equal to or larger than the given value.

The present disclosure may be embodied as a speaker recognizing program or a speaker recognizing apparatus that causes a computer to execute each of characteristic configurations included in the above speaker recognizing method. Obviously, such a speaker recognizing program can be distributed as a program recorded on a computer-readable non-transitory recording medium, such as CD-ROM, or as a program delivered through a communication network, such as the Internet. This applies also to a database making method, a database making apparatus, and a database making program.

Each of embodiments described below is a specific example of the present disclosure. Numerical values, shapes, constituent elements, steps, the order of steps, and the like are described in the following embodiments as examples, and are not intended for limiting the present disclosure. Among constituent elements included in the following embodiments, constituent elements not described in independent claims expressing the most superior concepts of the present disclosure will be described as optional constituent elements. Respective contents of all the embodiments may be combined with each other.

Embodiment

Figure 3:
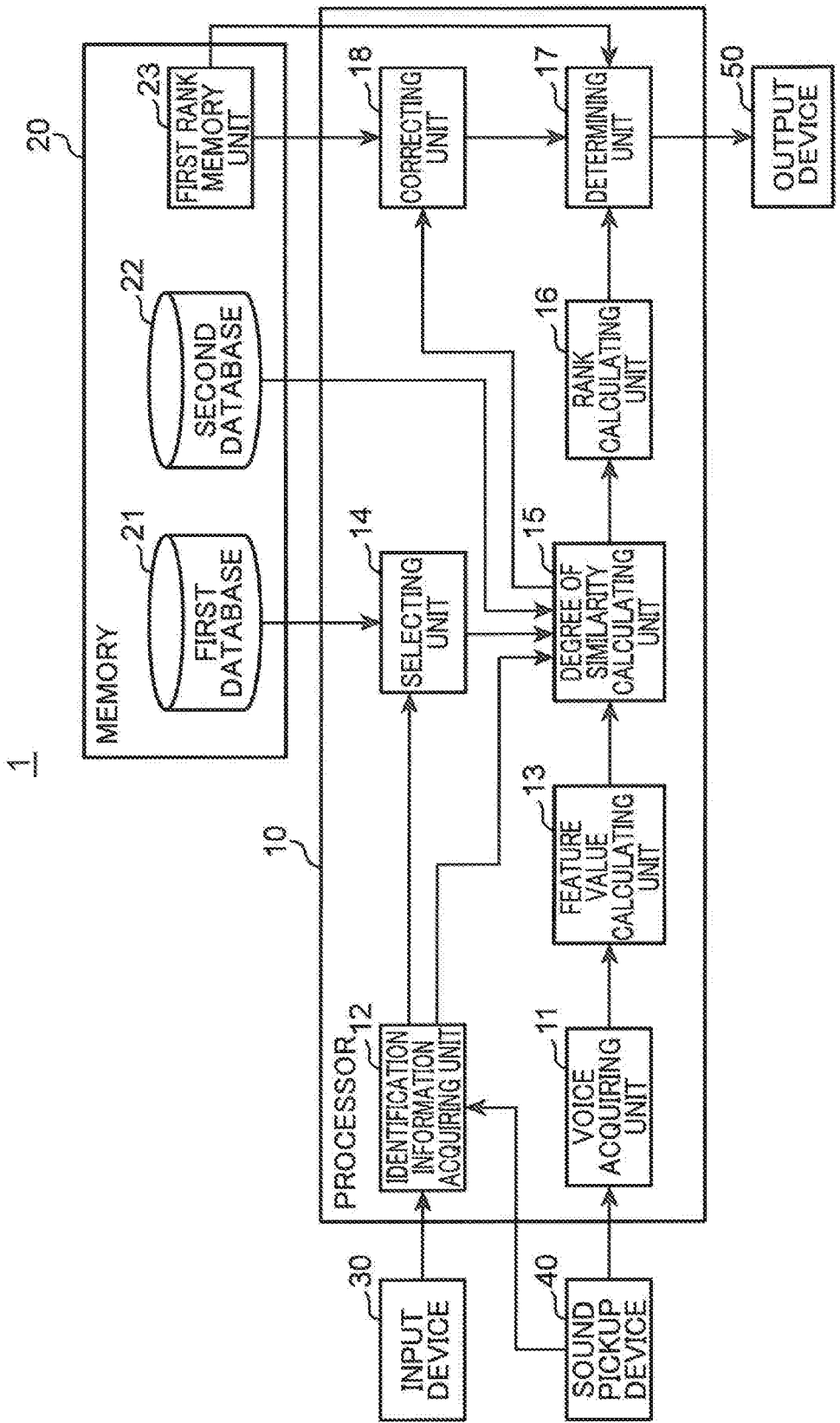
FIG. 3 is a block diagram of an example of a configuration of a speaker recognizing apparatus according to an embodiment of the present disclosure.

FIG. 3 is a block diagram of an example of a configuration of a speaker recognizing apparatus 1 according to an embodiment of the present disclosure. The speaker recognizing apparatus 1 includes a processor 10, a memory 20, and an output device 50. The processor 10 is connected to an input device 30 and to a sound pickup device 40. The speaker recognizing apparatus 1 may or may not include the input device 30 and to the sound pickup device 40.

The input device 30 is an input device having, for example, a keyboard, a mouse, a touch panel, and the like. On the input device 30, a subject speaker, who is a speaker to be recognized, enters subject identification information, which is identification information of the subject speaker. The input device 30 may be composed of a card reader, a radio frequency identifier (RFID) reader, or the like. In such a case, the subject speaker lets the card reader read a card carrying subject identification information or an RFID reader read an RFID tag carrying subject identification information to enter the subject identification information. Whether the subject speaker is an authentic person who the speaker claims to be is unknown. Therefore, basically, when the subject speaker is actually the authentic person, the subject identification information is identification information of the subject speaker. When the subject speaker is an impersonator, on the other hand, the subject identification information is identification information of a person different from the subject speaker.

The sound pickup device 40 is provided as, for example, a microphone. The sound pickup device 40 picks a voice uttered by the subject speaker, converts the voice into a voice signal, and inputs the voice signal to the processor 10.

The processor 10 is composed of a CPU or a dedicated electric circuit. The processor 10 includes a voice acquiring unit 11, an identification information acquiring unit 12, a feature value calculating unit 13, a selecting unit 14, a degree of similarity calculating unit 15, a rank calculating unit 16, a determining unit 17, and a correcting unit 18.

The voice acquiring unit 1 acquires a subject voice signal from the sound pickup device 40, the subject voice signal indicating a voice uttered by the subject speaker, and inputs the subject voice signal to the feature value calculating unit 13. The identification information acquiring unit 12 acquires subject identification information from the input device 30, the subject identification information being identification information of the authentic person who the subject speaker claims to be, and inputs the subject identification information to the selecting unit 14 and to the degree of similarity calculating unit 15.

Another form of subject identification information acquisition may be adopted, according to which the subject identification information is acquired by letting the subject speaker utter a claim that the subject speaker is the authentic person. In this case, the identification information acquiring unit 12 may carry out a voice recognition process on a subject voice signal picked by the sound pickup device 40 to acquire utterance contents representing a claim that the subject speaker is the authentic person, the utterance contents being included in the subject voice signal, thereby acquiring a text expressing the acquired utterance contents, as the subject identification information. An example of the utterance contents representing the claim that the subject speaker is the authentic person is the name of the authentic person, such as "Taro" and "Hanako". Through this process, the subject identification information can be acquired without prompting the subject speaker to enter the subject identification information.

The feature value calculating unit 13 calculates a first feature value that is a feature value of a subject voice signal, and inputs the calculated first feature value to the degree of similarity calculating unit 15. The feature value is, for example, an i-vector, an x-vector, or the like. The feature value calculating unit 13 has a learning model in which a voice signal is defined as input and a feature value is defined as output, the learning model containing learning data acquired in advance by using a number of voice signals. The feature value calculating unit 13 inputs a subject voice signal to this learning model, and calculates an output feature value, as the first feature value. For example, when the feature value is an x-vector, this learning model is composed of a deep neural network.

The selecting unit 14 selects a group including voice information associated with subject identification information, from a first database 21. FIG. 4 shows an example of a data configuration of the first database 21. The first database 21 is a database storing voice information indicating voices of a plurality of unspecified speakers. In the first database 21, for each of a plurality of registered speakers, pieces of voice information of unspecified speakers similar in voice feature to each other are grouped such that the pieces of voice information are associated in advance with identification information of a registered speaker corresponding to the group.

Specifically, the first database 21 includes a registered speaker ID column, a voice information ID column, and a voice information column. A registered speaker ID is identification information of a registered speaker. A registered speaker is a person of whom the registered speaker ID and voice information are stored in a second database 22, which will be described later, such that the registered speaker ID and the voice information are associated with each other in advance. In a case of adopting the identification information acquisition form of causing the input device 30, e.g., a card reader to read a card carrying identification information of a subject speaker to acquire subject identification information, the registered speaker ID is, for example, a string of symbols expressing the identification information recorded on the card. In a case of adopting the identification information acquisition form of analyzing a subject voice signal by a voice recognition process to acquire subject identification information, on the other hand, the registered speaker ID is, for example, a name. This applies also to the registered speaker ID in the second database 22.

According to this embodiment, the first database 21, for each of pieces of voice information of the registered speakers, calculates a degree of similarity of the voice information of the registered speaker to pieces of voice information of unspecified speakers to rank the pieces of voice information of unspecified speakers in the order of higher similarity to the voice information of the registered speaker, and extracts pieces of voice information of unspecified speakers equal to or smaller than a given second rank. This process puts pieces of voice information of unspecified speakers into a plurality of groups. Thus, by specifying a registered speaker ID, voice information of an unspecified speaker included in one group is acquired from the first database 21.

According to the test results shown in FIG. 1, the error rate in each utterance time can be reduced by setting a small number of unspecified speakers, such as "S" and "26", instead of setting a large number of unspecified speakers, such as "3268" and "1634". For this reason, for example, a minimum number of unspecified speakers that entirely minimizes error rates in a plurality of utterance times, such as "51" and "26", can be adopted as the second rank.

A voice information ID is identification information for identifying voice information of an unspecified speaker. An unspecified speaker is a person of whom voice information is stored in the first database 21. The voice information ID is merely identification information for identifying voice information, and does not serve as information for identifying a person. A person, therefore, cannot be identified by the voice information ID. An unspecified speaker thus refers to a person not specified in any terms, except that voice information of the person is registered with the first database 21.

In the voice information column, voice information of an unspecified speaker is entered. The voice information is entered, for example, as the feature value described above. In this case, in the voice information column, the feature value is entered, which is acquired in advance by inputting a voice signal of the unspecified speaker to the above learning model. This is, however, merely an example. In another example, the voice signal of the unspecified speaker may be entered in the voice information column. In such a case, the feature value calculating unit 13 calculates a feature value of a voice signal of an unspecified speaker included in a group selected by the selecting unit 14, and inputs the feature value, together with a subject voice signal, to the degree of similarity calculating unit 15. When the voice information is a feature value, a series Y1, Y2, . . . in the voice information column is multi-dimensional vectors representing the feature value. When the voice information is a voice signal, the series Y1, Y2, . . . in the voice information column is waveform data of the voice signal.

For example, when subject identification information of a registered speaker with a registered speaker ID "A" is input, the selecting unit 14 selects voice information included in a group corresponding to the registered speaker ID "A", from the first database 21, and inputs the selected voice information to the degree of similarity calculating unit 15.

Now, FIG. 3 will be referred to again. The degree of similarity calculating unit 15 calculates a degree of similarity between voice information of an unspecified speaker, the voice information being selected by the selecting unit 14, and a first feature value. The degree of similarity calculating unit 15 also acquires voice information corresponding to subject identification information input by the identification information acquiring unit 12, from the second database 22, and calculates a degree of similarity between the acquired voice information and the first feature value, as a subject degree of similarity. The degree of similarity calculating unit 15 then inputs the degree of similarity and the subject degree of similarity, which are calculated by the degree of similarity calculating unit 15, to the rank calculating unit 16 and to the correcting unit 18. Specifically, the degree of similarity calculating unit 15 associates the degree of similarity with a voice information ID and inputs the degree of similarity associated with the voice information ID to the rank calculating unit 16, and associates the subject degree of similarity with subject identification information (registered speaker ID) and inputs the subject degree of similarity associated with the subject identification information to the rank calculating unit 16.

The second database 22 is a database in which identification information and voice information of a plurality of registered speakers are stored such that the identification information and the voice information are associated with each other. FIG. 5 shows an example of a data configuration of the second database 22. The second database 22 includes a registered speaker ID column and a voice information column. A registered speaker ID is identification information of a registered speaker. In the voice information column, voice information of a registered speaker is entered. The voice information is a feature value, as in the case of the first database 21. However, this is merely an example. The voice information, as in the case of the first database 21, may be a voice signal.

For example, when subject identification information of the registered speaker with the registered speaker ID "A" is input, the degree of similarity calculating unit 15 acquires voice information recorded in the first field from the second database 22, and calculates a degree of similarity between the acquired voice information and a first feature value, as a subject degree of similarity.

To express the degree of similarity, such similarity indexes as Euclidean distance, cosine similarity, and Mahalanobis' distance can be adopted. When a similarity index that gets smaller as similarity gets higher is adopted, for example, the degree of similarity is expressed as the reciprocal of the similarity index. In this case, the degree of similarity as the reciprocal of the similarity index gets larger as similarity gets higher.

Now, FIG. 3 will be referred to again. The rank calculating unit 16 calculates a rank of a subject degree of similarity in degrees of similarity, which are input from the degree of similarity calculating unit 15, and inputs the calculated rank to the determining unit 17. The rank calculating unit 16 calculates the rank of the subject degree of similarity by specifying at which place the subject degree of similarity is ranked when the degrees of similarity and the subject degree of similarity, which are input from the degree of similarity calculating unit 15, are ranked in the order of higher similarity.

The determining unit 17 acquires a corrected first rank from the correcting unit 18, and when the rank of the subject degree of similarity, which is input from the rank calculating unit 16, is equal to or smaller than the first rank, determines that the subject speaker is the authentic person. When the rank of the subject degree of similarity, which is input from the rank calculating unit 16, is larger than the first rank, on the other hand, the determining unit 17 determines that the subject speaker is not the authentic person. According to the present disclosure, the correcting unit 18 may be omitted, in which case the determining unit 17 acquires the first rank from a first rank memory unit 23.

The correcting unit 18 calculates the variance of a parent population including the subject degree of similarity and the degrees of similarity, which are input from the degree of similarity calculating unit 15, and, as the variance decreases, raises the first rank in ranking and inputs the raised first rank to the determining unit 17. As the variance of the parent population including the subject degree of similarity and the degrees of similarity; which are input from the degree of similarity calculating unit 15, increases, however, the correcting unit 18 lowers the first rank in ranking. The first rank may be increased/decreased, for example, step by step in corresponding to a decrease/increase in the variance value or may be increased/decreased continuously. When the first rank is increased/decreased step by step, for example, the correcting unit 18 specifies an increment or decrement of the first rank corresponding to a calculated variance, using a correction table in which a plurality of classes of variance categorization and increments/decrements of the first rank for respective classes are associated in advance with each other. In the above case, the correcting unit 18 calculates the variance of the parent population including the subject degree of similarity and the degrees of similarity. Instead of calculating the variance, however, the correcting unit 18 may calculate the standard deviation of the parent population. When calculating the variance or the standard deviation, the correcting unit 18 may omit the subject degree of similarity from the parent population.

The output device 50 includes a display and a speaker, and outputs a result of determination made by the determining unit 17. When the subject speaker is determined to be the authentic person, the output device 50 outputs a message reporting the subject speaker's being authenticated, to the display and/or to the speaker. When the subject speaker is not determined to be the authentic person, the output device 50 outputs a message reporting the subject speaker's not being authenticated, to the display and/or to the speaker.

The memory 20 is, for example, a non-volatile memory, such as an electrically erasable programmable read-only memory (EEPROM). The memory 20 includes the first rank memory unit 23, in addition to the first database 21, which has been described with reference to FIG. 4, and the second database 22, which has been described with reference to FIG. 5. The first rank memory unit 23 stores the first rank that the determining unit 17 uses to determine whether the subject speaker is the authentic person.

The first rank is determined by the following method, as by the technique disclosed in Japanese Unexamined Patent Application Publication No. 2017-223848. Specifically, voice signals of a number of speakers for system development (hereinafter "registered voice signal") are prepared, and one speaker A is selected from the speakers while the rest of them are regarded as impersonators. Subsequently, a certain threshold (e.g., rank "100") is set, and degrees of similarity in feature value between a voice signal indicating a voice actually uttered by the speaker A and registered voice signals of all the speakers for system development are calculated, and then a rank of a degree of similarity in feature value between the voice signal indicating the voice actually uttered by the speaker A and a registered voice signal of the speaker A, the degree of similarity being ranked in the degrees of similarity, is calculated. If the calculated rank is larger than rank "100", it is determined that the authentic person is rejected.

In addition, degrees of similarity in feature value between a voice signal indicating a voice actually uttered by an impersonator who is different from the speaker A and registered voice signals of all the speakers for system development are calculated, and then a rank of a degree of similarity in feature value between the voice signal indicating the voice actually uttered by the impersonator and the registered voice signal of the speaker A, the degree of similarity being ranked in the degrees of similarity, is calculated. If the calculated rank is equal to or smaller than rank "100", it is determined that different person is accepted.

These determinations on rejection of the authentic person and acceptance of the different person are executed in sequence as the speaker A is switched. Through this process, an authentic person rejection rate and a different person acceptance rate for the threshold of rank "100" are calculated. Then, the threshold is changed in 10 ranks when the threshold is equal to or smaller than rank "100", and is changed in 100 ranks when the threshold is equal to or larger than rank "100". In those cases, an authentic person rejection rate and a different person acceptance rate are calculated for each threshold set. This operation creates a growing curve indicating a relationship between the authentic person rejection rate plotted on the vertical axis and the threshold plotted on the horizontal axis, and a declining curve indicating a relationship between the different person acceptance rate plotted on the vertical axis and the threshold plotted on the horizontal axis. An intersection between both curves is then calculated, and a threshold corresponding to that intersection is determined to be the first rank.

Figure 6:
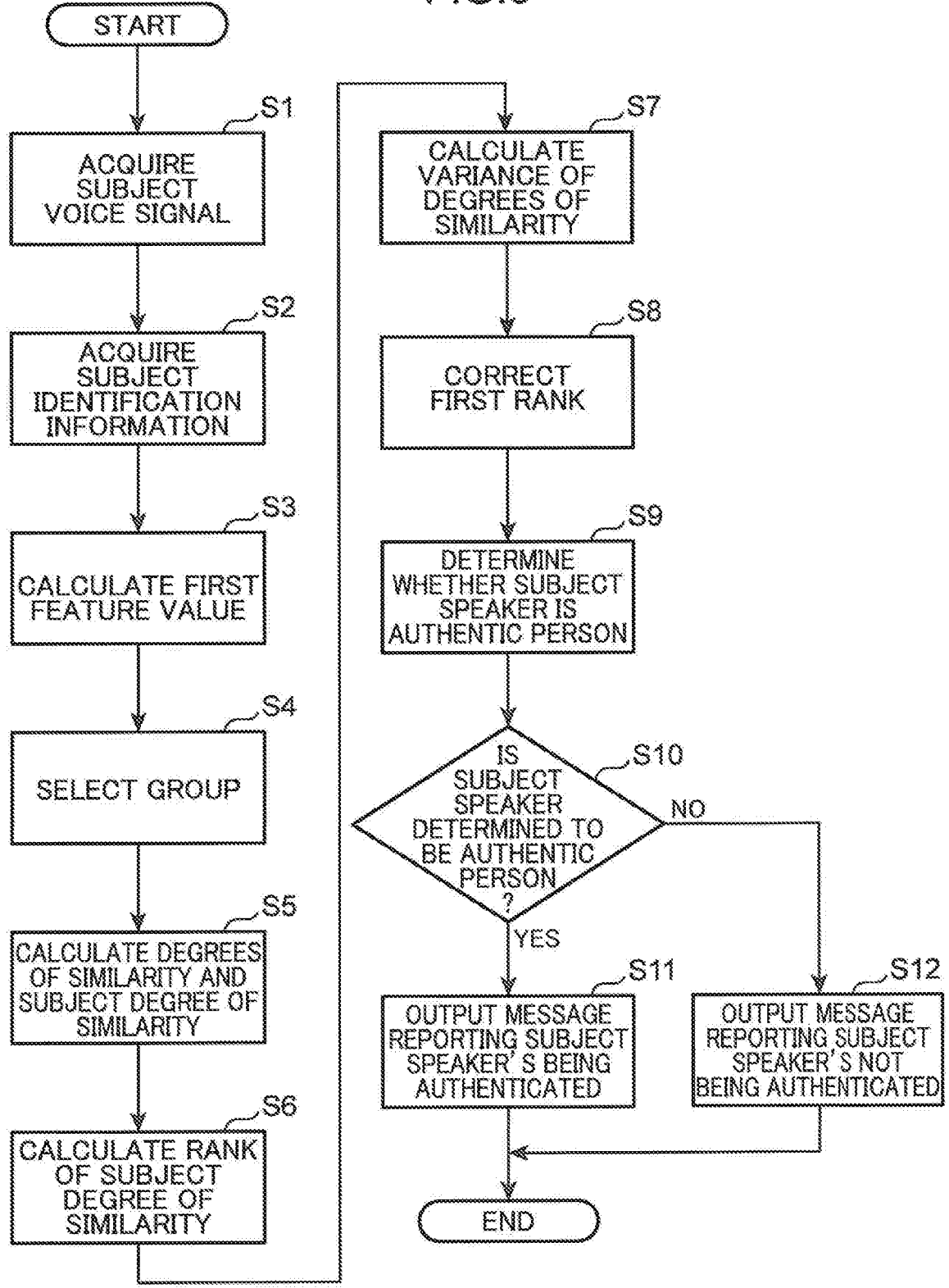
FIG. 6 is a flowchart showing an example of a process carried out by the speaker recognizing apparatus according to the embodiment of the present disclosure.

A process carried out by the speaker recognizing apparatus 1 according to this embodiment will then be described. FIG. 6 is a flowchart showing an example of the process carried out by the speaker recognizing apparatus 1 according to the embodiment of the present disclosure. The voice acquiring unit 11 acquires a subject voice signal picked by the sound pickup device 40 (step S1). Subsequently, the identification information acquiring unit 12 acquires subject identification information from the subject voice signal input to the input device 30 or picked by the sound pickup device 40 (step S2).

Subsequently, the feature value calculating unit 13 inputs the subject voice signal to a learning model to calculate a first feature value (step S3). Subsequently, the selecting unit 14 selects a group corresponding to the subject identification information (registered speaker ID), from the first database 21, and inputs pieces of voice information of unspecified speakers included in the selected group, to the degree of similarity calculating unit 15 (step S4).

Subsequently, the degree of similarity calculating unit 15 calculates degrees of similarity between the pieces of voice information of unspecified speakers included in the selected group and the first feature value, and also calculates a subject degree of similarity between voice information corresponding to the subject identification information (registered speaker ID), the voice information being stored in the second database 22, and the first feature value (step S5).

Subsequently, the rank calculating unit 16 calculates a rank of the subject degree of similarity in the degrees of similarity calculated by the degree of similarity calculating unit 15 (step S6). Subsequently, the correcting unit 18 calculates the variance of the subject degree of similarity and the degrees of similarity that are calculated by the degree of similarity calculating unit IS (step S7).

The correcting unit 18 then corrects a first rank in such a way as to raise the first rank in ranking as the calculated variance decreases and to lower the first rank in ranking as the calculated variance increases (step S8).

Subsequently, the determining unit 17 compares the rank of the subject degree of similarity with the corrected first rank, thereby determining whether a subject speaker is an authentic person who the subject speaker claims to be (step S9). When the rank of the subject degree of similarity is equal to or smaller than the first rank, the determining unit 17 determines the subject speaker to be the authentic person (YES at step S10), and the process flow proceeds to step S11. When the rank of the subject degree of similarity is larger than the first rank (NO at step S10), the determining unit 17 determines the subject speaker not to be the authentic person (NO at step S10), and the process flow proceeds to step S12.

At step S11, because the subject speaker has been determined to be the authentic person, the output device 50 outputs a message reporting the subject speaker's being authenticated. At step S12, because the subject speaker is determined not to be the authentic person, the output device 50 outputs a message reporting the subject speaker's being not authenticated.

FIG. 7 shows an example of messages output by the output device 50. In FIG. 7, a screen G71 is a screen that appears on the display when the subject speaker is determined to be the authentic person, and a screen G72 is a screen that appears on the display when the subject speaker is determined not to be the authentic person. As shown in the screen G71, when the subject speaker is determined to be the authentic person, "Authenticated", which is a message reporting the subject speaker's being authenticated, appears on the display. As shown in the screen G72, when the subject speaker is determined not to be the authentic person, "Not authenticated", which is a message reporting the subject speaker's being not authenticated, appears on the display. In this manner, the subject speaker can recognize quickly whether the subject speaker has been authenticated or not.

Use cases of the speaker recognizing apparatus 1 according to this embodiment will then be described. A first use case is a case where the speaker recognizing apparatus 1 is applied to an internet banking service. In this case, the subject speaker enters identification information in a bank's web site, using the subject speaker's portable terminal, to log in to the bank's web site. When the subject speaker makes a request for paying an amount of money into the subject speaker's account registered with the bank, the speaker recognizing apparatus 1 requests the subject speaker to utter a phrase. Responding to this request, the subject speaker utters a certain phrase (e.g., the subject speaker's name, today's weather, or the like). As a result, the speaker recognizing apparatus 1 acquires the identification information entered by the subject speaker upon logging in to the bank's web site, as subject identification information, and also acquires a voice signal indicative of a voice uttered by the subject speaker, as a subject voice signal, thus determining whether the subject speaker is the subject speaker himself or herself, i.e., authentic person. When the subject speaker is determined to be the authentic person, the screen G71 appears on the display of the portable terminal. When the subject speaker is determined not to be the authentic person, the screen G72 appears on the display of the portable terminal.

A second use case is a case where the speaker recognizing apparatus 1 is applied to a room access control system. In this case, the subject speaker first brings his or her card closer to a card reader attached to the entrance of a room the subject speaker wants to enter, and lets the card reader read identification information recorded on the card. Following this, the speaker recognizing apparatus 1 requests the subject speaker to utter a phrase. The subject speaker thus utters a certain phrase (e.g., the subject speaker's name, today's weather, or the like). As a result, the speaker recognizing apparatus 1 acquires the identification information read by the card reader, as subject identification information, and also acquires a voice signal indicative of a voice uttered by the subject speaker, as a subject voice signal, thus determining whether the subject speaker is the subject speaker himself or herself, i.e., authentic person. When the subject speaker is determined to be the authentic person, the speaker emits a voice message telling the subject speaker's entry to the room is permitted, and the speaker recognizing apparatus 1 outputs a control command to open the door, which is sent to the door to open the door. When the subject speaker is determined not to be the authentic person, for example, the speaker emits a voice message telling the subject speaker's entry to the room is not permitted, in which case the door is not opened.

In this manner, according to this embodiment, when the degrees of similarity are calculated, pieces of voice information of all the unspecified speakers, the pieces of voice information being stored in the first database 21, are not used but pieces of voice information included in the selected group, that is, pieces of voice information of unspecified speakers similar to voice information of the authentic person who the subject speaker claims to be, are used. As a result, according to this embodiment, the accuracy in identifying the subject speaker as the authentic person can be improved without increasing the calculation volume. In addition, according to this embodiment, the accuracy in identifying the subject speaker as the authentic person can be improved also in a case where the utterance time is short.

Figure 8:
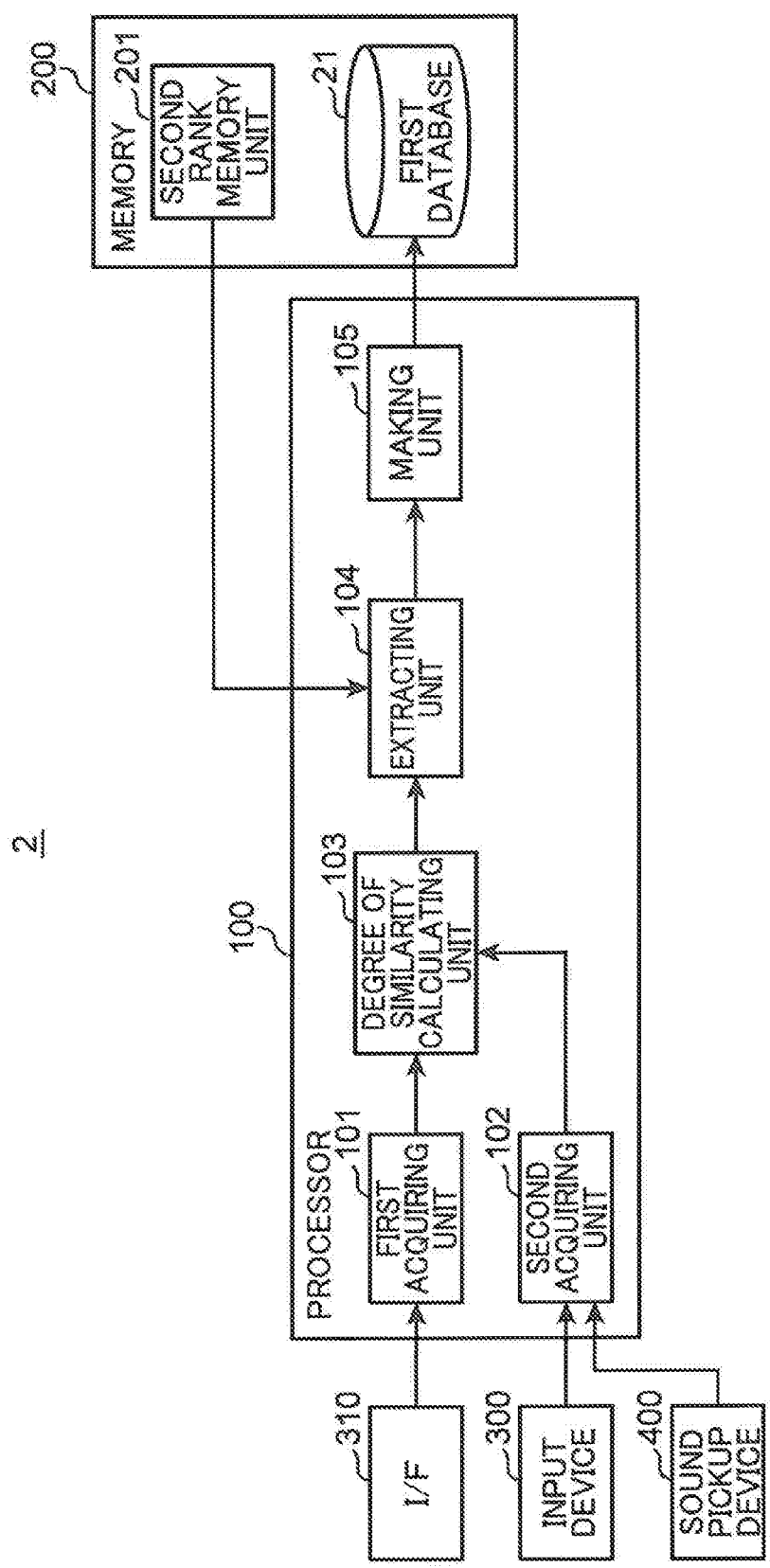
FIG. 8 is a block diagram of an example of a configuration of a database making apparatus according to the embodiment of the present disclosure.

A database making apparatus according to the embodiment of the present disclosure will then be described. FIG. 8 is a block diagram of an example of a configuration of a database making apparatus 2 according to the embodiment of the present disclosure. The database making apparatus 2 includes a processor 100, a memory 200, an input device 300, an interface circuit 310, and a sound pickup device 400.

The interface circuit 310 is, for example, a memory interface, a network interface, or the like. The interface circuit 310 receives incoming voice signals of a plurality of unspecified speakers from an external memory, an external network, or the like.

The input device 300 is an input device having, for example, a keyboard, a mouse, a touch panel, and the like.

To the input device 300, identification information of a plurality of registered speakers is input.

The sound pickup device 400 is provided as, for example, a microphone. The sound pickup device 400 picks voices of the registered speakers, converts the picked voices into voice signals, and inputs the voice signals to the processor 100. The voice signal and identification information of each of the registered speakers are input to the processor 100 in a synchronized manner.

The processor 100 is composed of a CPU or a dedicated electric circuit. The processor 100 includes a first acquiring unit 101, a second acquiring unit 102, a degree of similarity calculating unit 103, an extracting unit 104, and a making unit 105.

The first acquiring unit 101 acquires voice signals of the unspecified speakers, which are input from the interface circuit of the input device 300, and inputs the acquired voice signals to the degree of similarity calculating unit 103. The second acquiring unit 102 acquires identification information of the registered speakers, which is input from the input device 300, and voice signals of the registered speakers, which are input from the sound pickup device 400. The second acquiring unit 102 associates identification information of each registered speaker with a voice signal of each registered speaker, the voice signal being input in synchronization with input of the identification information, and inputs the voice signal associated with the identification information, to the degree of similarity calculating unit 103.

The degree of similarity calculating unit 103 inputs the voice signals of the unspecified speakers, which are input from the first acquiring unit 101, to a learning model to calculate a feature value of the voice signal of each unspecified speaker. The degree of similarity calculating unit 103 also inputs a feature value of the voice signal of each registered speaker, the voice signal being associated with the identification information and input to the degree of similarity calculating unit 103, to the learning model to calculate the feature value of the voice signal of each registered speaker. The learning model is the same learning model used by the speaker recognizing apparatus 1.

The degree of similarity calculating unit 103 then calculates a degree of similarity between feature values of the voice signals of the registered speakers and feature values of the voice signals of the unspecified speakers. The degree of similarity is the same degree of similarity used by the speaker recognizing apparatus 1.

The extracting unit 104 extracts a voice signal of an unspecified speaker having a degree of similarity meeting a given first condition. The first condition is, for example, a requirement that the degree of similarity be equal to or smaller than the second rank, which has been described in the description of the speaker recognizing apparatus 1. In this case, for each of the registered speakers, the extracting unit 104 ranks the voice signals of the unspecified speakers in the order of higher degree of similarity to give the voice signals of the unspecified speakers respective ranks. For each of the registered speakers, the extracting unit 104 then extracts a voice signal of an unspecified speaker with a rank equal to or smaller than the second rank, as the voice signal that meets the first condition.

The first condition may be a condition that requires the degree of similarity be equal to or larger than a given value. In another case, the first condition may be a condition that requires the degree of similarity be equal to or smaller than the second rank and be equal to or larger than the given value as well. Setting the first condition in this manner prevents a case where a voice signal of which a rank in degree of similarity is equal to or smaller than the second rank but of which the degree of similarity to a voice signal of a registered speaker is actually low is included in a group corresponding to the registered speaker.

The making unit 105, for each of the registered speakers, associates identification information of the registered speaker with voice signals (voice information) extracted for each registered speaker to group the voice signals of unspecified speakers to make the first database 21, and stores the first database 21 in the memory 200. In this process, the making unit 105 may give a voice information ID to each of the voice signals of unspecified speakers. Hence the first database 21 as shown in FIG. 4 is made.

The memory 200 is a non-volatile memory, such as an EEPROM, and includes a second rank memory unit 201 and the first database 21. The second rank memory unit 201 stores the second rank which is used when the extracting unit 104 extracts a voice signal of an unspecified speaker.

Figure 9:
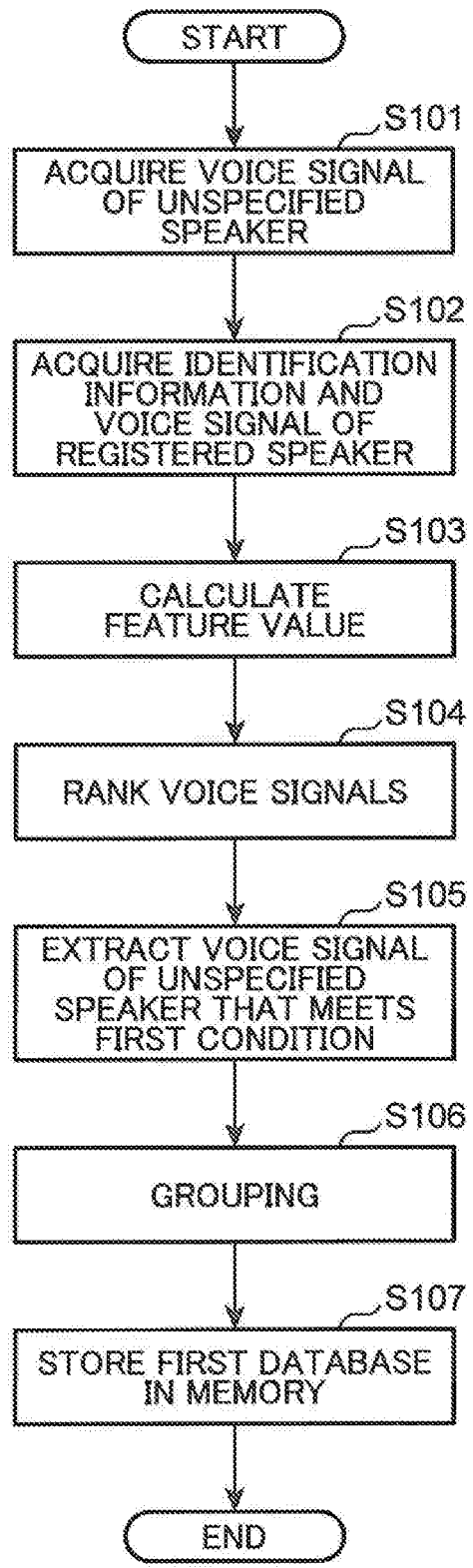
FIG. 9 is a flowchart showing an example of a process carried out by the database making apparatus according to the embodiment of the present disclosure.

An operation carried out by the database making apparatus 2 according to the embodiment of the present disclosure will then be described. FIG. 9 is a flowchart showing an example of the process carried out by the database making apparatus 2 according to the embodiment of the present disclosure.

The first acquiring unit 101 acquires voice signals of a plurality of unspecified speakers via the interface circuit 310 (step S101). Subsequently, the second acquiring unit 102 acquires identification information of a plurality of registered speakers input from the input device 300 and respective voice signals of the registered speakers picked by the sound pickup device 400 (step S102).

Subsequently, the degree of similarity calculating unit 103 inputs the voice signals of the unspecified speakers and the voice signals of the registered speakers, to the learning model, thus calculating feature values of the voice signals of the unspecified speakers and feature values of the voice signals of the registered speakers (step S103).

Subsequently, for each of the registered speakers, the extracting unit 104 ranks the voice signals of the unspecified speakers in the order of higher degree of similarity (step S104).

The extracting unit 104 then, for each of the registered speakers, extracts a voice signal of an unspecified speaker that meets the first condition, that is, a voice signal of an unspecified speaker with a rank in degree of similarity that is equal to or smaller than the second rank and equal to or larger than the given value (step S105).

Subsequently, the making unit 105, for each of the registered speakers, associates identification information (registered speaker ID) of the registered speaker with extracted voice signals (voice information) of unspecified speakers to group the voice signals of unspecified speakers, thereby making the first database 21 (step S106). The making unit 105 then stores the first database 21 in the memory 200 (step S107).

According to the database making apparatus 2 of this embodiment, for each of the registered speakers, a voice signal of an unspecified speaker having a degree of similarity meeting the first condition is extracted, and for each of the registered speakers, identification information of the registered speaker is associated with extracted voice signals of unspecified speakers. Through this process, the voice signals of unspecified speakers are grouped to make the first database 21. Thus, a database for achieving a speaker recognizing method that improves the accuracy in identifying the subject speaker as the authentic person without increasing calculation volume, can be made.

It has been described above that the first acquiring unit 101 acquires voice signals of unspecified speakers, but the present disclosure is not limited to this configuration. The first acquiring unit 101 may acquire feature values of voice signals of unspecified speakers.

The making unit 105 makes the first database 21 by using voice signals as voice information, but the present disclosure is not limited to this configuration. The making unit 105 may make the first database 21 by using feature values of voice signals as voice information.

Figure 10:
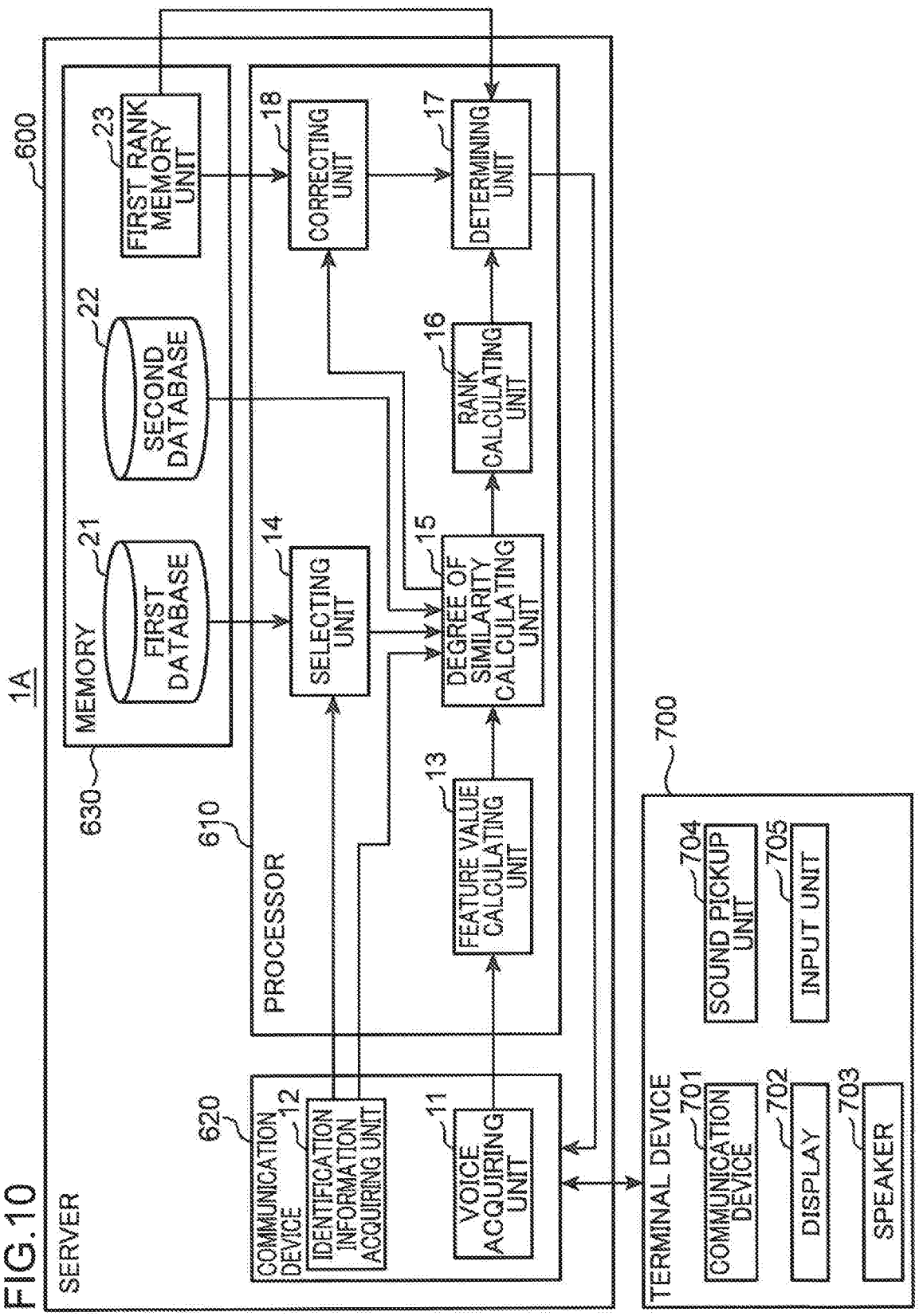
FIG. 10 is a block diagram of an example of a configuration of a speaker recognizing apparatus according to a modification of the present disclosure.

A speaker recognizing apparatus 1A provided as a modification of the speaker recognizing apparatus 1 will then be described. FIG. 10 is a block diagram of an example of a configuration of the speaker recognizing apparatus 1A according to the modification of the present disclosure. The speaker recognizing apparatus 1A serves as the speaker recognizing apparatus 1 running in a cloud environment, and includes a server 600. To the server 600, a terminal device 700 is connected via a given network such that the terminal device 700 can communicate with the server 600. The given network is, for example, a wide area network including the Internet and a cellular phone network or a local area network including a wired LAN or a wireless LAN.

The server 600 includes a processor 610, a communication device 620, and a memory 630. Similar to the processor 10 of the speaker recognizing apparatus 1, the processor 610 includes the feature value calculating unit 13, the selecting unit 14, the degree of similarity calculating unit 15, the rank calculating unit 16, the determining unit 17, and the correcting unit 18. According to this modification, however, the voice acquiring unit 11 and the identification information acquiring unit 12, which are included in the processor 10 of the speaker recognizing apparatus 1, are included in the communication device 620.

The communication device 620 is composed of, for example, a communication circuit that connects the server 600 to the given network.

In this modification, the voice acquiring unit 11 acquires a subject voice signal from the terminal device 700, via the network. In this modification, the identification information acquiring unit 12 acquires subject identification information from the terminal device 700, via the network.

The memory 630 is the same in configuration with the memory 20 of the speaker recognizing apparatus 1.

The terminal device 700 is, for example, a portable terminal, such as a tablet terminal and a smartphone, or a desktop computer. The terminal device 700 includes a communication device 701, a display 702, a speaker 703, a sound pickup unit 704, and an input unit 705.

The communication device 701 is, for example, a communication circuit that connects the terminal device 700 to the given network. The display 702 is, for example, a liquid crystal panel, and displays the screens G71 and G72 shown in FIG. 7.

The speaker 703 outputs a voice message reporting a result of determination made by the determining unit 17 on whether the subject speaker is the authentic person, the voice message being sent from the communication device 620. When the subject speaker is determined to be the authentic person, the speaker 703 outputs a voice message telling the subject speaker's being authenticated. When the subject speaker is determined not to be the authentic person, the speaker 703 outputs a voice message telling the subject speaker's not being authenticated.

The sound pickup unit 704 is provided as, for example, a microphone. The sound pickup unit 704 picks a voice uttered by the subject speaker, and converts the voice into a voice signal. The converted voice signal is transmitted as a subject voice signal, from the communication device 701 to the server 600.

The input unit 705 is, for example, a touch panel, a keyboard, a mouse, and the like, and receives subject identification information entered by the subject speaker. The entered subject identification information is transmitted from the communication device 701 to the server 600. This modification allows implementing a speaker recognizing method of the present disclosure on a cloud system.

A database making apparatus 2A provided as a modification of the database making apparatus 2 will then be described. FIG. 11 is a block diagram of an example of a configuration of the database making apparatus 2A according to the modification of the present disclosure. The database making apparatus 2A serves as the database making apparatus 2 running in a cloud environment, and includes a server 800.

To the server 800, a terminal device 900 is connected via a given network such that the terminal device 900 can communicate with the server 800. The given network is, for example, a wide area network including the Internet and a cellular phone network or a local area network including a wired LAN or a wireless LAN.

The server 800 includes a processor 810, a communication device 820, and a memory 830. Similar to the processor 100 of the database making apparatus 2, the processor 810 includes the degree of similarity calculating unit 103, the extracting unit 104, and the making unit 105. According to this modification, however, the first acquiring unit 101 and the second acquiring unit 102, which are included in the processor 100 of the database making apparatus 2, are included in the communication device 820.

The communication device 820 is composed of, for example, a communication circuit that connects the server 800 to the given network.

In this modification, the first acquiring unit 101 acquires subject voice signals of a plurality of unspecified speakers via the network. In this modification, the second acquiring unit 102 acquires identification information and a voice signal of a registered speaker from the terminal device 900, via the network. The memory 830 is the same in configuration with the memory 200 of the database making apparatus 2.

The terminal device 900 is, for example, a portable terminal, such a tablet terminal and a smartphone, or a desktop computer. The terminal device 900 includes a communication device 901, a sound pickup unit 902, and an input unit 903.

The communication device 901 is, for example, a communication circuit that connects the terminal device 900 to the given network. The sound pickup unit 902 is provided as, for example, a microphone. The sound pickup unit 902 picks a voice uttered by the subject speaker, and converts the voice into a voice signal. The converted voice signal is transmitted from the communication device 901 to the server 800.

The input unit 903 is, for example, a touch panel, a keyboard, a mouse, and the like, and receives identification information entered by the registered speaker. The entered identification information is associated with the voice signal and is transmitted from the communication device 901 to the server 800. This modification allows implementing a database making method of the present disclosure on a cloud system.

The present disclosure provides the following modifications.

(1) The speaker recognizing apparatus 1 shown in FIG. 3 and the database making apparatus 2 shown in FIG. 8 may be mounted on the same computer.

(2) In FIG. 10, the first database 21 and the second database 22 may be mounted on an apparatus different from the server 600, the apparatus being connected to the server 600 via a network.

(3) When the speaker recognizing apparatus 1 shown in FIG. 3 and the database making apparatus 2 shown in FIG. 8 are composed respectively of different computers, the database making apparatus 2 transmits the first database 21 made by the database making apparatus 2, to the speaker recognizing apparatus 1 via a network.

(4) In the above embodiment, the first rank may be a value that is calculated separately for each registered speaker, or the same value that applies to every registered speaker.

According to the present disclosure, the accuracy in identifying the subject speaker as the authentic person can be improved without increasing the calculation volume. The present disclosure is, therefore, usable as a technique for preventing impersonation.

This application is based on Japanese Patent application No. 2019-076058 filed in Japan Patent Office on Apr. 12, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A speaker recognizing method according to which a computer recognizes a speaker, using a first database storing voice information indicating voices of a plurality of unspecified speakers and a second database storing identification information of a plurality of registered speakers and the voice information such that the identification information and the voice information are associated with each other, wherein in the first database, for each of the registered speakers, pieces of the voice information of unspecified speakers similar in voice feature to each other are grouped such that the pieces of the voice information are associated in advance with the identification information of a registered speaker corresponding to the group, and wherein the speaker recognizing method comprises:

acquiring a subject voice signal indicating a voice uttered by a subject speaker;

acquiring subject identification information that is the identification information of an authentic person who the subject speaker claims to be;

calculating a first feature value representing a feature value of the subject voice signal;

selecting a group including pieces of the voice information associated with the subject identification information, from the first database;

calculating degrees of similarity between the pieces of the voice information included in the selected group and the first feature value and a subject degree of similarity representing a degree of similarity between the voice information associated with the subject identification information, the voice information being stored in the second database, and the first feature value;

calculating a rank of the subject degree of similarity in the calculated degrees of similarity; and when the rank is equal to or smaller than a given first rank, determining the subject speaker to be the authentic person.

2. The speaker recognizing method according to claim 1, wherein a variance or standard deviation of the calculated degrees of similarity is calculated, and
wherein the first rank is raised in ranking as the variance or standard deviation decreases.

3. The speaker recognizing method according to claim 1, wherein the subject identification information is the identification information entered by the subject speaker.

4. The speaker recognizing method according to claim 1, wherein the subject voice signal includes utterance contents that the subject speaker claims himself or herself to be the authentic person, and
wherein the subject identification information is the utterance contents obtained by processing the subject voice signal through voice recognition.

5. The speaker recognizing method according to claim 1, wherein a result of determination on whether the subject speaker is the authentic person is displayed.

6. The speaker recognizing method according to claim 1, wherein the voice information stored in the first database includes a voice signal of the unspecified speaker,
wherein the voice information stored in the second database includes the voice signal of the registered speaker,
wherein a feature value of the voice signal of the unspecified speaker and a feature value of the voice signal associated with the subject identification information, the voice signal being stored in the second database, are each calculated as a second feature value, and
wherein in calculation of the degree of similarity, the degree of similarity between the first feature value and the second feature value is calculated.

7. The speaker recognizing method according to claim 1, wherein the voice information stored in the first database includes a feature value of a voice signal of the unspecified speaker, and
wherein the voice information stored in the second database is the feature value of the voice signal of the registered speaker.

8. The speaker recognizing method according to claim 1, wherein the first database is a database in which, for each of the registered speakers, pieces of the voice information with the rank in the degree of similarity to the voice information of the unspecified speakers being equal to or smaller than a given second rank are extracted and grouped, and
wherein the second rank is a minimum number of the unspecified speakers that is preset for minimizing an error rate.

9. A speaker recognizing apparatus that recognizes a speaker, using a first database storing voice information indicating voices of a plurality of unspecified speakers and a second database storing identification information of a plurality of registered speakers and the voice information such that the identification information and the voice information are associated with each other,
wherein in the first database, for each of the registered speakers, pieces of the voice information of unspecified speakers similar in voice feature to each other are grouped such that the pieces of the voice information are associated in advance with the identification information of a registered speaker corresponding to the group, and
wherein the speaker recognizing apparatus comprises:

a voice acquirer that acquires a subject voice signal indicating a voice uttered by a subject speaker;
an identification information acquirer that acquires subject identification information that is the identification information of an authentic person who the subject speaker claims to be;
a feature value calculator that calculates a first feature value representing a feature value of the subject voice signal;
a selector that selects a group including pieces of the voice information associated with the subject identification information, from the first database;
a degree of similarity calculator that calculates degrees of similarity between the pieces of the voice information included in the selected group and the first feature value and a subject degree of similarity representing a degree of similarity between the voice information associated with the subject identification information, the voice information being stored in the second database, and the first feature value;
a rank calculator that calculates a rank of the subject degree of similarity in the calculated degrees of similarity; and
a determiner that when the rank is equal to or smaller than a given first rank, determines the subject speaker to be the authentic person.

10. A non-transitory, computer-readable recording medium having recorded thereon a speaker recognizing program for causing a computer to execute speaker recognizing operations, including:
recognizing a speaker, using a first database storing voice information indicating voices of a plurality of unspecified speakers and a second database storing identification information of a plurality of registered speakers and the voice information such that the identification information and the voice information are associated with each other;
grouping in the first database, for each of the registered speakers, pieces of the voice information of unspecified speakers similar in voice feature to each other such that the pieces of the voice information are associated in advance with the identification information of a registered speaker corresponding to the group;
acquiring a subject voice signal indicating a voice uttered by a subject speaker;
acquiring subject identification information that is the identification information of an authentic person who the subject speaker claims to be;
calculating a first feature value representing a feature value of the subject voice signal;
selecting a group including pieces of the voice information associated with the subject identification information, from the first database;
calculating degrees of similarity between the pieces of the voice information included in the selected group and the first feature value and a subject degree of similarity representing a degree of similarity between the voice information associated with the subject identification information, the voice information being stored in the second database, and the first feature value;
calculating a rank of the subject degree of similarity in the calculated degrees of similarity; and
when the rank is equal to or smaller than a given first rank, determining the subject speaker to be the authentic person.

* * * * *